(12) United States Patent
Tsukahara

(10) Patent No.: US 6,169,991 B1
(45) Date of Patent: Jan. 2, 2001

(54) CLIENT SERVER SYSTEM AND CONTROL METHOD THEREOF

(75) Inventor: Hiroshi Tsukahara, Nagoya (JP)

(73) Assignee: Mitsubishi Denki Kabushiki Kaisha, Tokyo (JP)

( * ) Notice: Under 35 U.S.C. 154(b), the term of this patent shall be extended for 0 days.

(21) Appl. No.: 08/163,761

(22) Filed: Dec. 9, 1993

(30) Foreign Application Priority Data

Dec. 9, 1992 (JP) .................................................. 4-329433
Nov. 30, 1993 (JP) .................................................. 5-300221

(51) Int. Cl.[7] .................................................. G06F 17/30
(52) U.S. Cl. .................................................. 707/102
(58) Field of Search .............................. 395/600; 707/102

(56) References Cited

U.S. PATENT DOCUMENTS

| | | | |
|---|---|---|---|
| 4,141,066 | 2/1979 | Keiles | 364/119 |
| 5,008,853 | * 4/1991 | Bly et al. | 345/331 |
| 5,276,867 | * 1/1994 | Kenley et al. | 707/204 |
| 5,317,568 | * 5/1994 | Bixby et al. | 370/85.6 |
| 5,325,505 | * 6/1994 | Hoffecker et al. | 707/101 |
| 5,341,477 | * 8/1994 | Pitkin et al. | 395/200 |
| 5,369,570 | * 11/1994 | Parad | 364/401 |

FOREIGN PATENT DOCUMENTS

| | | |
|---|---|---|
| 1411182 | 10/1975 | (GB) . |
| 1481609 | 8/1977 | (GB) . |
| 2128782 | 5/1984 | (GB) . |
| 2199966 | 7/1988 | (GB) . |
| 2246218 | 1/1992 | (GB) . |
| 3147151 | 6/1991 | (JP) . |
| 410825 | 1/1992 | (JP) . |
| 4150358 | 5/1992 | (JP) . |

OTHER PUBLICATIONS

H.-R. Aschmann, et al., "A Remote Procedure Call Environment for Fault–Tolerant, Heterogeneous, Distributed Systems", IEEE Micro, 11(1991), Oct. , No. 5, Los Alamitos, CA, pp. 16–19 and 60–67.

"Dynamic Transfers of Tasks Among Computers", NTIS Tech Notes (1990) Feb., Springfield, VA, pp. 123–124.

* cited by examiner

Primary Examiner—Wayne Amsbury
(74) Attorney, Agent, or Firm—Sughrue, Mion, Zinn, Macpeak & Seas, PLLC

(57) ABSTRACT

A client server system to which a plurality of client machine devices are coupled. Each client machine device executes a database data generation task and database data processing task which are a plurality of functional tasks each corresponding to a different function. A master task and common memory for controlling each database data generation task and database data processing task is disposed in each client machine device to allow a function originally handled by a client machine device in a work load concentration state or abnormal state to be handled by another client machine device.

17 Claims, 20 Drawing Sheets

FIG.13

| P1 | P2 | P3 DATABASE DATA GENERATION TASK | | | | P4 DATABASE DATA PROCESSING TASK | | | |
|---|---|---|---|---|---|---|---|---|---|
| ∗ | ∗∗ | FUNCTION A | FUNCTION B | FUNCTION C | FUNCTION D | FUNCTION A | FUNCTION B | FUNCTION C | FUNCTION D |
| 001 | 1 | 1 | 1 | 0 | 0 | 1 | 1 | 0 | 0 |
| 002 | 1 | 0 | 0 | 1 | 0 | 0 | 0 | 1 | 0 |
| 003 | 1 | 0 | 0 | 0 | 1 | 0 | 0 | 0 | 1 |

OPERATION STATE FILE   F1

∗ DEVICE NO.
∗∗ OPERATION STATE

| DEVICE NO. | LEVEL | OPERATION STATE | DATABASE DATA GENERATION TASK ||||  DATABASE DATA PROCESSING TASK ||||
|---|---|---|---|---|---|---|---|---|---|---|
| | | | FUNCTION A | FUNCTION B | FUNCTION C | FUNCTION D | FUNCTION A | FUNCTION B | FUNCTION C | FUNCTION D |
| 001 | 1 | * | 1 | 1 | 0 | 0 | 1 | 1 | 0 | 0 |
| | 2 | 002 FAULT | 1 | 1 | 1 | 0 | 1 | 1 | 1 | 0 |
| | 3 | 002 003 FAULT | 1 | 1 | 1 | 1 | 1 | 1 | 1 | 1 |

Q1: DEVICE NO., Q2: LEVEL, Q3: OPERATION STATE, Q4: DATABASE DATA GENERATION TASK, Q5: DATABASE DATA PROCESSING TASK

\* OTHER THAN THOSE DESCRIBED BELOW    EXECUTE FUNCTION FILE

| DEVICE NO. | LEVEL | OPERATION STATE | DATABASE DATA GENERATION TASK |||| DATABASE DATA PROCESSING TASK ||||
|---|---|---|---|---|---|---|---|---|---|---|
| | | | FUNCTION A | FUNCTION B | FUNCTION C | FUNCTION D | FUNCTION A | FUNCTION B | FUNCTION C | FUNCTION D |
| 002 | 1 | * | 0 | 0 | 1 | 0 | 1 | 0 | 1 | 0 |
| | 2 | 003 FAULT | 0 | 0 | 1 | 1 | 0 | 0 | 1 | 1 |
| | 3 | 001 003 FAULT | 1 | 1 | 1 | 1 | 1 | 1 | 1 | 1 |

\* OTHER THAN THOSE DESCRIBED BELOW    EXECUTE FUNCTION FILE

| DEVICE NO. | LEVEL | OPERATION STATE | DATABASE DATA GENERATION TASK |||| DATABASE DATA PROCESSING TASK ||||
|---|---|---|---|---|---|---|---|---|---|---|
| | | | FUNCTION A | FUNCTION B | FUNCTION C | FUNCTION D | FUNCTION A | FUNCTION B | FUNCTION C | FUNCTION D |
| 003 | 1 | * | 0 | 0 | 0 | 1 | 0 | 0 | 0 | 1 |
| | 2 | 001 FAULT | 1 | 1 | 0 | 1 | 1 | 1 | 0 | 1 |
| | 3 | 001 002 FAULT | 1 | 1 | 1 | 1 | 1 | 1 | 1 | 1 |

\* OTHER THAN THOSE DESCRIBED BELOW    EXECUTE FUNCTION FILE

| DEVICE NO. | * | DATABASE DATA GENERATION TASK ||||  DATABASE DATA PROCESSING TASK ||||
|---|---|---|---|---|---|---|---|---|---|
| | | FUNCTION A | FUNCTION B | FUNCTION C | FUNCTION D | FUNCTION A | FUNCTION B | FUNCTION C | FUNCTION D |
| 0 0 1 | 1 | 1 | 1 | 0 | 0 | 1 | 1 | 0 | 0 |
| 0 0 2 | 0 | 0 | 0 | 0 | 0 | 0 | 0 | 0 | 0 |
| 0 0 3 | 1 | 0 | 0 | 0 | 1 | 0 | 0 | 0 | 1 |

\* OPERATION STATE    OPERATION STATE FILE

CLIENT SERVER SYSTEM AND CONTROL METHOD THEREOF

FIELD OF THE INVENTION

This invention relates to a client server system, and more particularly to a client server system and a control method thereof which processes data collected from control apparatus and outputs the processed data to a server.

BACKGROUND OF THE INVENTION

FIG. 17 is a block diagram illustrating the general configuration of a conventional client server system 601, and in this figure, this client server system 601 comprises a server 96, and client machine devices 501a to 501c, all of which are interconnected by a communication line (PC-LAN) 5. PLCs 86a to 86c are programmable controllers connected to the client server system 601. Each of the client machine devices 501a to 501c collects data from the PLCs 86a to 86c, processes the data by function A and function B (such as quality control and availability analysis in factory automation-FA), and transfers the result to the server 96. The server 96 has a database 96a which stores data from the client machine devices 501a to 501c.

FIG. 18 is a block diagram illustrating a task configuration in the client machine device 501a. Herein the term "task" is defined as a minimum execution unit for a program, which is an object for scheduling required to decide an execution sequence. In this figure, the reference numeral 91 indicates a data collection task for collecting data from the PLCs 86a to 86c, the reference numeral 92 indicates a common memory in which the data collected by the data collection task 91 is written, and the reference numeral 93AB indicates a data generation task for a database for an integrated function A (data used in quality control)/function B (data used in availability analysis) database.

Also the reference numeral 94 indicates a network database communication task for communicating with a database 96a in the server 96, the reference numeral 97AB indicates a database data processing task for a database for an integrated function A/function B database for output of a processing request to the database 96a (such as generation, renewal, and insertion) to a network database communication task 94, and the reference numeral 98 indicates a man/machine CRT display processing task for executing processing according to an operator instruction (i.e., instruction for screen display) from a console device 99.

It should be noted that the client machine device 501b has almost the same configuration as the client machine device 501a. However it also has a function C database data generation task for a database (generation of data used in collecting facility maintenance information) and a function C database data processing task in place of the integrated function A/function B database data generation task 93AB for and the integrated function A/function B database data processing task 97AB. Also it should be noted that the client machine device 501c has a function D database data generation task (generation of data used in collecting tool life information) and a function D database data processing task.

Now description is made hereinafter of the operations of the system. It should be noted that, as operations of the client machine devices 501b and 501c are almost the same as those of the client machine device 501a (Only the functions served by each are different), description is made for only operations of the client machine device 501a. At first, the data collection task 91 collects data from the PLCs 86a to 86c at a specified interval and writes the data to be stored data in a common memory 92. FIG. 19 is a drawing illustrating configuration of the common memory 92, and the common memory 92 comprises a storage area for bit signals and a storage area for numerical data.

FIG. 20A shows 1 record of stored data 151 in the storage area for bit signals, and FIG. 20B shows 1 record of stored data 152 in the storage area for numerical data. The 1 record of storage area 151 stores an "instantaneous value" sent as a bit signal, "data of generation" (month, day, hour, minute), "ON time" and "Number of ON times". Furthermore, the 1 record stores "status", namely "1" for inversion of a bit signal or "0" for non-inversion thereof as compared to that collected previously. 1 record of stored data 152 stores a "instantaneous value" sent as numerical data, an "average value" of each instantaneous value, a "MAXIMUM value", a "MINIMUM" value, a "data count value", "normalized data", and "raw data". Furthermore the 1 record stores "status", namely "0" for numerical data and "1" for less than a specified lower limit.

Then, the function A/function B database data generation task 93AB reads stored data 151 and 152 in the common memory 92, and then sends a processing request (i.e., generation, renewal, and insertion) to the database 96a to the network database communication task 94. Then, a console 99 sends a processing request via the man/machine CRT display processing task to the function A/function B database data processing task 97AB when a screen display request is entered by an operator.

The function A/function B database data processing task 97AB causes the database 96a of the server 96 to execute processing to retrieve data and transfers the result of retrieval to the man/machine CRT display processing task 98. The man/machine CRT display processing task 98 displays the transferred result of retrieval on a CRT of the console device 99.

In addition, technological documents relating to the present invention include the Japanese Patent Laid Open Publication No.19325/1992 disclosing a "multi-host connection control system", the Japanese Patent Laid Open Publication No.150358/1992 disclosing a "communication control device", and the Japanese Patent Laid Open Publication No.147151/1991 disclosing a "portable resource-sharing file server with transplantation using common routines".

In the conventional type of client server system as described above, a number of tasks exists in each client machine device, and the function A/function B database data generation task 93AB is an integrated one, so that, if a processing speed of any client machine device is slower than a processing speed of the entire system, it is necessary to adjust the work load to the client machine device by, for instance, reducing a number of tasks or minimizing a size of the program for each task, which means an increase of work load to each programmer and lower work efficiency. Also in a database data generation task for database, collected data is read into a common memory, which requires a long time, and furthermore in a data collection task a change in data is determined by comparing collected data to previous data, which makes the processing efficiency lower. In addition, in a client server system based on the conventional art, if any client machine device fails, a spare client machine device is used, and for this reason sometimes some data is lost, or the system cost increases.

SUMMARY OF THE INVENTION

It is object of the invention to provide a client server system and a control method thereof which can make it easier to adjust a work load and improve the work efficiency as well as the processing efficiency by reducing the time required for data transaction and to prevent data from being lost and system cost from increasing by eliminating the necessity for a spare client machine device.

According to the invention, the master task controls each database data processing task and database data generation task each comprising a plurality of functional tasks each corresponding to a different function in a first client machine device. When a work load concentration state or abnormal state in a second client machine device is detected, the first client machine device is caused to additionally execute a function that originally was the responsibility of the client machine device in the work load concentration state or abnormal state.

And, according to the invention, the individual function database data generation task demands delivery of data to the data collection task and the data collection task stores the collected data and delivers said required data directly to the individual function database data generation task according to the delivery request.

And, according to the invention, the data collection task extracts changes in the collected data.

And, according to the invention, the operation state of each task in the client machine device is stored as an operating state file in the server.

And, according to the invention, the client server system makes a determination as to the state of another client machine device based on information concerning the operating state stored in the operating state file, executes, if any client machine device is faulty, processing which should originally be executed by the faulty client machine device in addition to the processing being carried out currently, and executes regular processing in a normal state before the faulty state was detected when the abnormal client machine device is restored to the normal state.

A client server system according to the present invention can adjust the work load to the system by controlling each database data generation task in a client machine according to an event sequence, so that the work efficiency is substantially improved.

Also the data collection task stores collected data and directly delivers the collected data to a corresponding individual function database data generation task according to a request for delivery from a database data generation task to reduce the time required for receiving data, and furthermore the data collection task raises various types of processing speeds by extracting only changes in the collected data, thus the processing speed of the entire system being substantially raised.

Also the data collection task stores the operating state of each task in a client machine device in a server as an operating state file, makes a determination as to the state of the other client machine devices based on information concerning the operating state stored in the operating state file, executes a function or functions which should originally be executed by any abnormal client machine device in addition to the processing being carried out currently if any abnormality is detected, and executed regular jobs in a normal state when the abnormal client machine device is restored to the normal state, so that data loss can be prevented and a system can be built with a low cost with an increase in system operation cost prevented.

Other objects and features of this invention will become understood from the following description with reference to the accompanying drawings.

BRIEF DESCRIPTION OF THE DRAWINGS

FIG. 13 is a view illustrating contents of an operating state file;

FIG. 14A is a view illustrating contents of an execute function file;

FIG. 14B is a view illustrating contents of an execute function file;

FIG. 14C is a view illustrating contents of an execute function file;

FIG. 16 is a view illustrating innovative contents of the operating state file;

DESCRIPTION OF THE PREFERRED EMBODIMENTS

Figure 1:
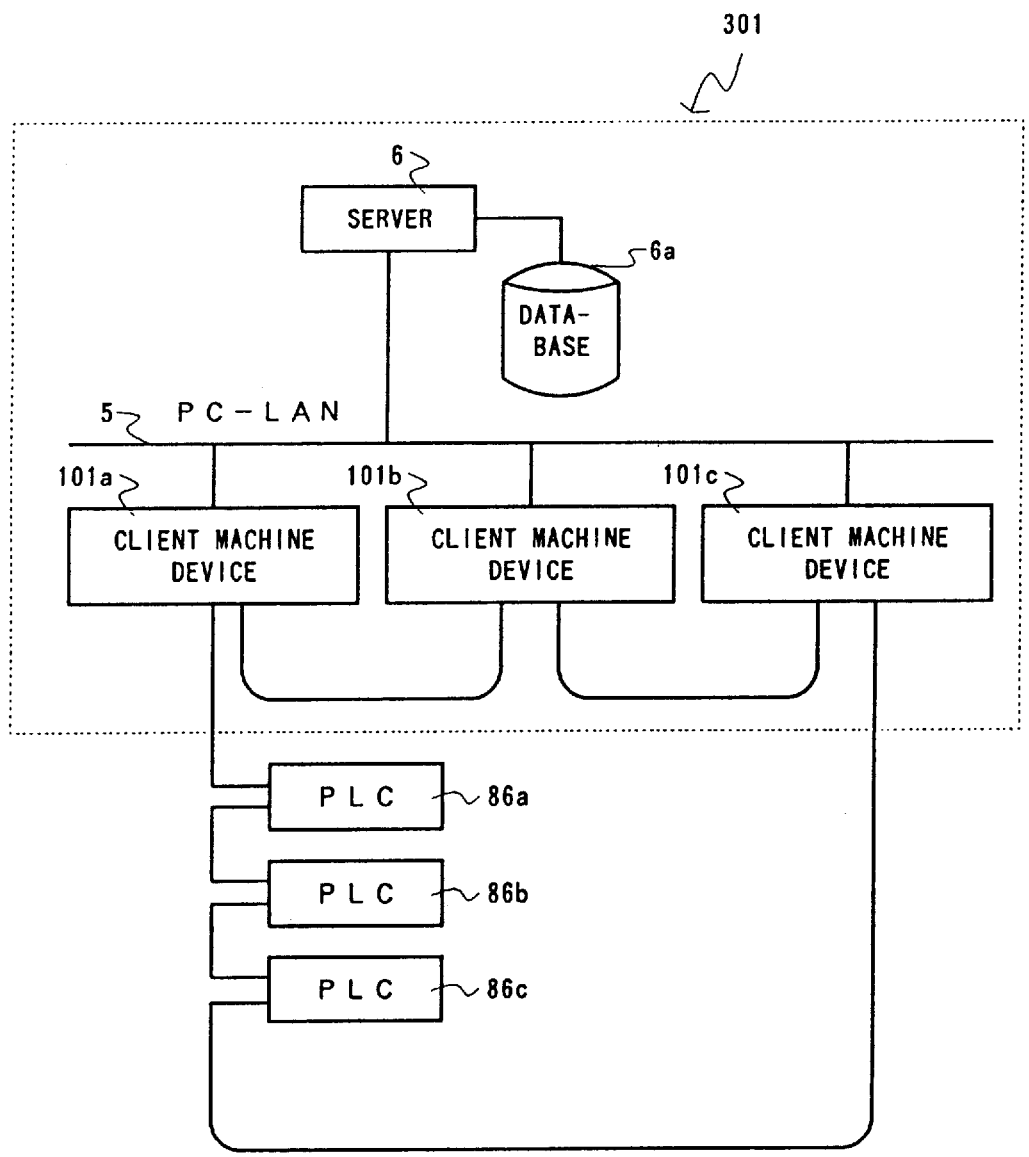
FIG. 1 is a block diagram illustrating the general configuration of a client server system according to the present invention.

Description is made hereinafter for a client server system according to the present invention with reference to the related drawings. FIG. 1 is a block diagram illustrating a client server system 301 according to the present invention, and in this figure the client server system 301 comprises a server 6, and client machine devices 101a to 101c, all of which are interconnected by a communication line (PC-LAN) 5. PLCs 86a to 86c are programmable controllers as a control apparatus connected to the client server system 601. Programmable controllers are used by way of example for control apparatus in this embodiment, in addition, bar code readers and numerical controllers can be used as the control apparatus, for example.

Each of the client machine devices 101a to 101c collects data from the PLCs 86a to 86c, processes the data for each function, and provides the processed data to a server 6 as an output. The server 6 has a database 6a in which data from client machine devices 101a to 101c is stored.

Figure 2:
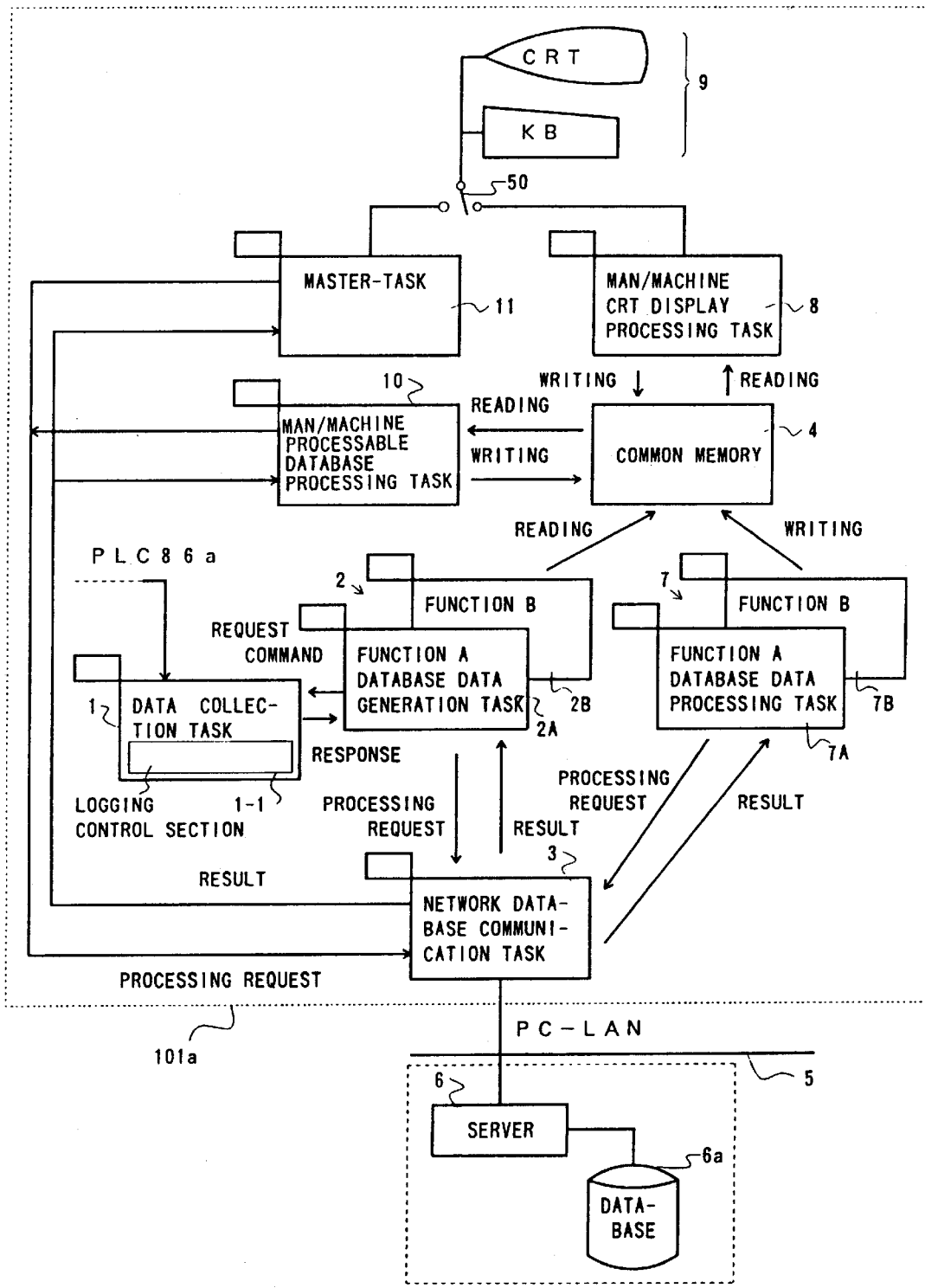
FIG. 2 is a block diagram illustrating a task configuration in a client machine device shown in FIG. 1.

FIG. 2 is a block diagram illustrating a task configuration in the client machine device 101a, and the reference numeral 1 indicates a data collection task for collecting data from the PLCs 86a to 86c. This data collection task 1 has a storage control section 1—1. The reference numeral 2 comprises a function A database data generation task 2A and a function B database data generation task 2B, and indicates a data generation task for processing collected data and generating data for output to the server 6. The function A database data generation task 2A and the function B database data generation task 2B have a functionally disconnectable configuration which an operator can freely select to drive or to stop function of the tasks. Namely the function A/function B database data generation tasks 2A and 2B has a configuration wherein control concerning an event sequence can be carried out with an event flag based on a master-task control by a master-task 11. The function A/function B database data generation tasks 2A and 2B comprise a plurality of functional tasks each corresponding to a different function, and the master-task 11 controls each database data generation tasks 2A and 2B in self the client machine device 101a, when a work load concentration state or abnormal state in one of the other client machine devices is detected. The numeral 3 indicates a network database communication task for communicating with a database 6a in the server 6.

In this figure, the block 7 comprises a function A database data processing task 7A and a function B database data processing task 7B, each of which is a database data processing task for writing a result of retrieval from the database 6a in the common memory 4 or for output of a processing request to the database 6a (such as generation, renewal, or insertion) to a network database communication task 3. It should be noted that each of the function A database data processing task 7A and the function B database data processing task 7B has a configuration which allows control over an event sequence with an event flag in the master task 11. The function A/function B database data processing tasks 7A and 7B comprises a plurality of functional tasks each corresponding to a different function, and the master-task 11 controls each database data processing tasks 7A and 7B in a first client machine device 101a when a work load concentration state or abnormal state including a faulted state for instance, in a second client machine device is detected.

In this figure, the reference numeral 8 indicates a man/machine CRT display processing task for read/write of contents in the common memory 4 according to instructions by an operator from the console device 9. The reference numeral 10 is a man/machine processable database data processing task for sending a processing request to the database 6a (such as a request to retrieve) to the network database communication task 3 and writing the result in the common memory 4. The numeral reference 11 indicates a master task for controlling start/stop of each task. The reference numeral 50 is a switch for switching a signal line comprised by the master-task 11 and the console device 9, or the man/machine CRT display processing task 8 and the console device 9.

It should be noted that the client machine device 101b has almost the same configuration as that of the client machine device 101a but has a function C database data generation task 2c and a function C database data processing task 7C in place of the database data generation tasks 2A, 2B and the database data processing tasks 7A, 7B. Also the client machine device 101c has a function D database data generation task 2D and a function D database data processing task 7D.

Figure 3:
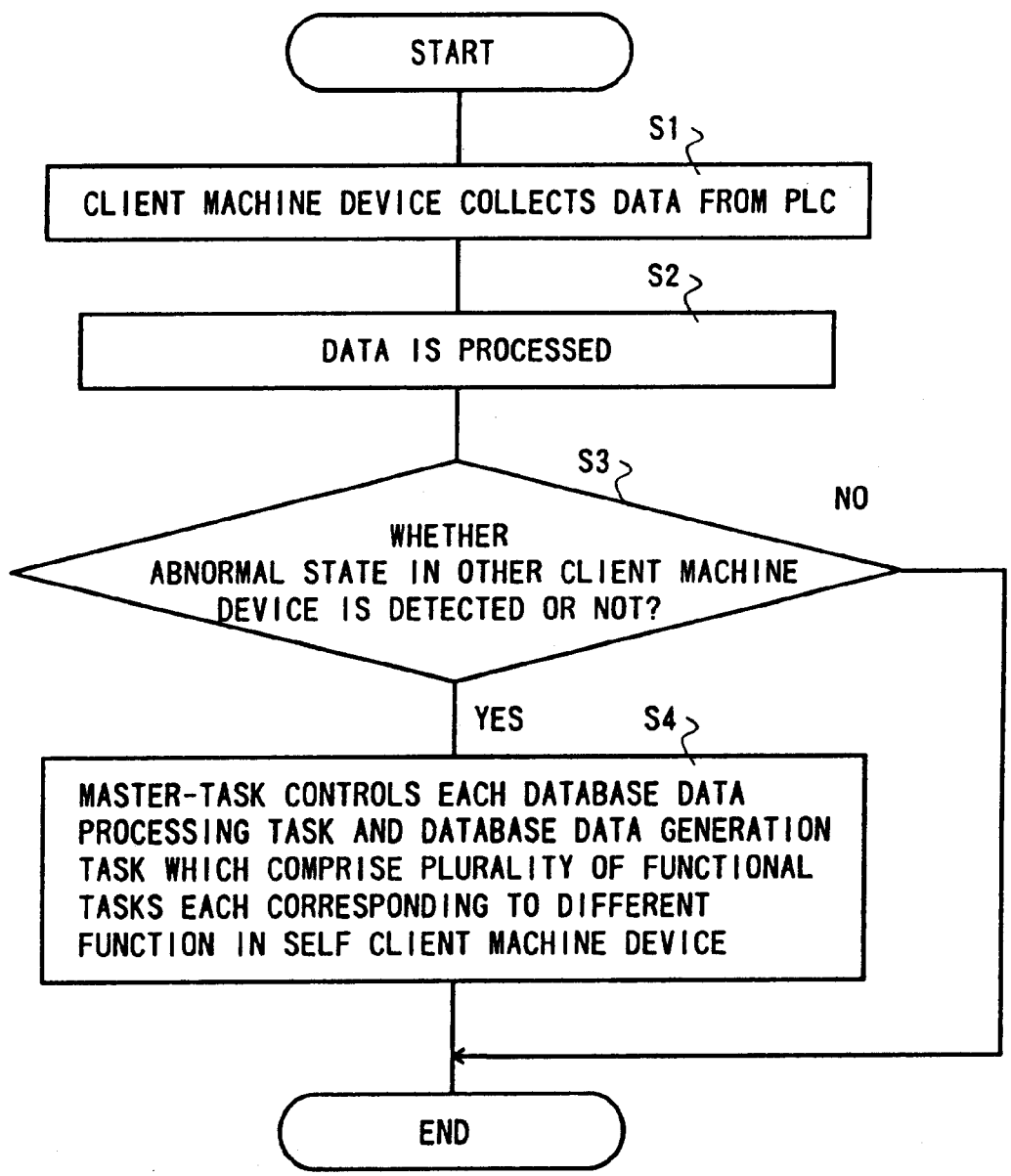
FIG. 3 is a flow chart illustrating fundamental operations of the client server system according to the present invention.

Next a description is made of the fundamental operations of the client server system according to the embodiment. FIG. 3 is a flow chart illustrating operations wherein, at first, the client machine devices 101a to 101c collects data from the PLCs 86a to 86c (S1), the data collected by the data collection task 1 is processed (S2), and provided as an output to the sever 6. The master-task 11 judges whether a work load concentration state or abnormal state in a client machine device is detected or not (S3). When a work load concentration state or abnormal state in a client machine device is detected, the master-task 11 controls each database data processing task 7 and database data generation task 2 which comprise a plurality of functional tasks each corresponding to a different function in a first client machine device (S4). The first client machine device additionally executes a function originally arranged to the client machine device which is in the work load concentration state or abnormal state.

Figure 4:
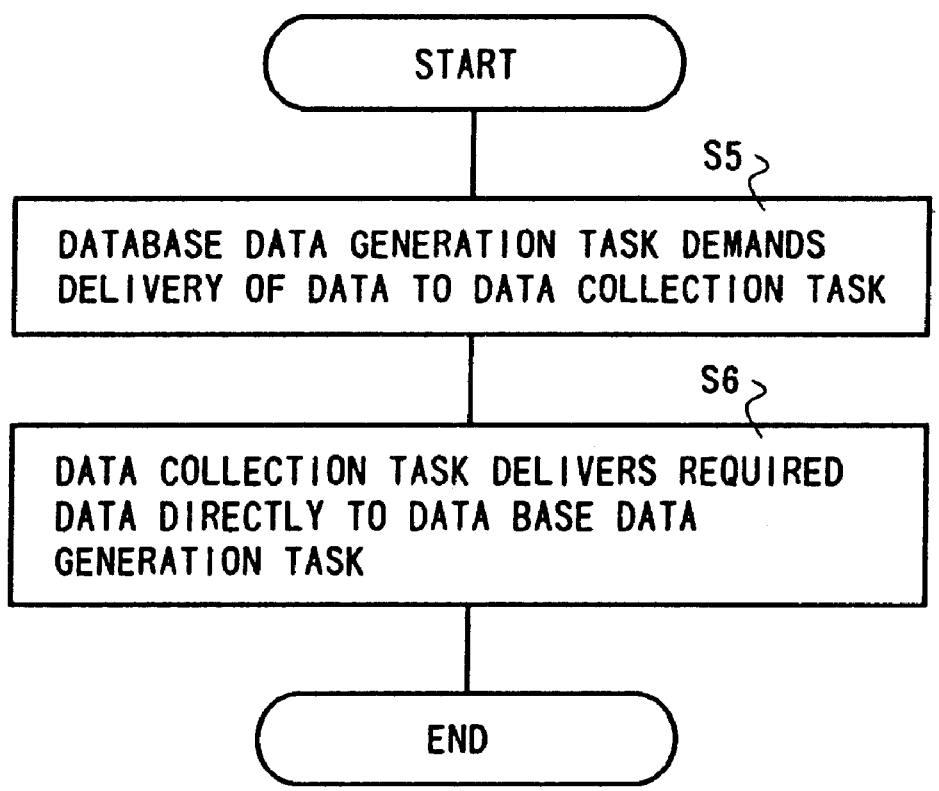
FIG. 4 is a flow chart illustrating fundamental operations of the client server system according to the present invention.

FIG. 4 is a flow chart illustrating operations wherein, the individual function database data generation task 2 demands delivery of data to the data collection task 1 (S5), the data collection task 1 stores the collected data and delivers the required data directly to the database data generation task 2 according to the delivery request (S6).

Figure 5:
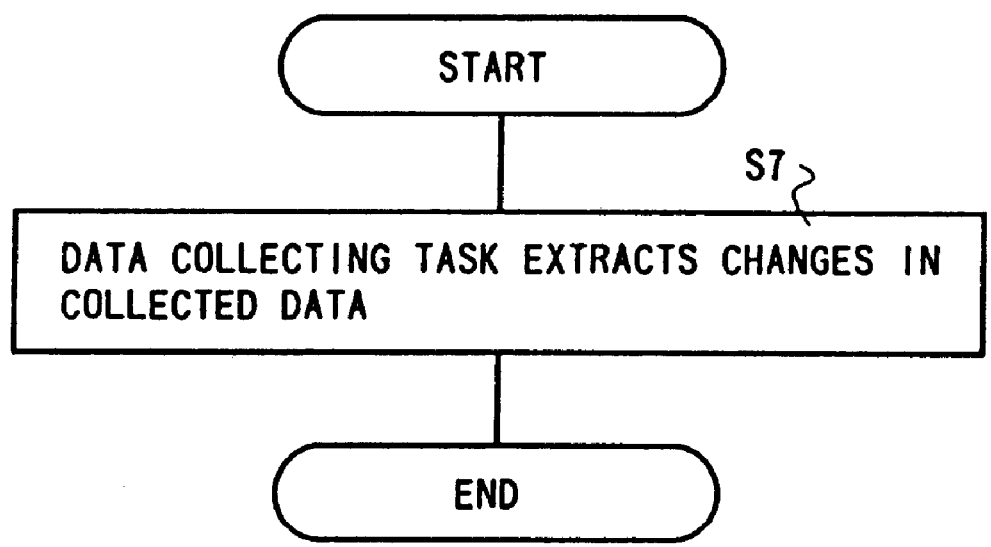
FIG. 5 is a flow chart illustrating fundamental operations of the client server system according to the present invention.

FIG. 5 is a flow chart illustrating operations wherein, the data collecting task 1 extracts changes in the collected data (S7).

Next a description is made for entire operation of the entire client machine device 101a. The data collection task 1 is a task for collecting data from the PLCs 86a to 86c, and collects data to be used in the database data generation task 2 for each functional database, such as, for instance, quality control data used by the function A and work sampling data used by the function B. The individual function database data generation task 2 collects data required in each function according to a request command, processes the collected data into a format for the database 6a, and executes a processing request such as update to the database 6a via the network database communication task 3.

The data collection task 1 is a task for collecting all the data required by the individual function database data generation task 2 from the PLCs 86a to 86c, and the database data generation task 2 and the database data processing task 7 can provide controls over an event sequence by the master task 11. The man/machine CRT display processing task 8 is processed by the database data generation task 2 as well as by the database data processing task 7, reads data each registered with a specific name from an area of the common memory 4, and displays the data. Also the man/machine CRT display processing task 8 executes a processing request such as a retrieval to the database 6a and the man/machine accessible processing task 10 via the common memory 4.

Figure 6:
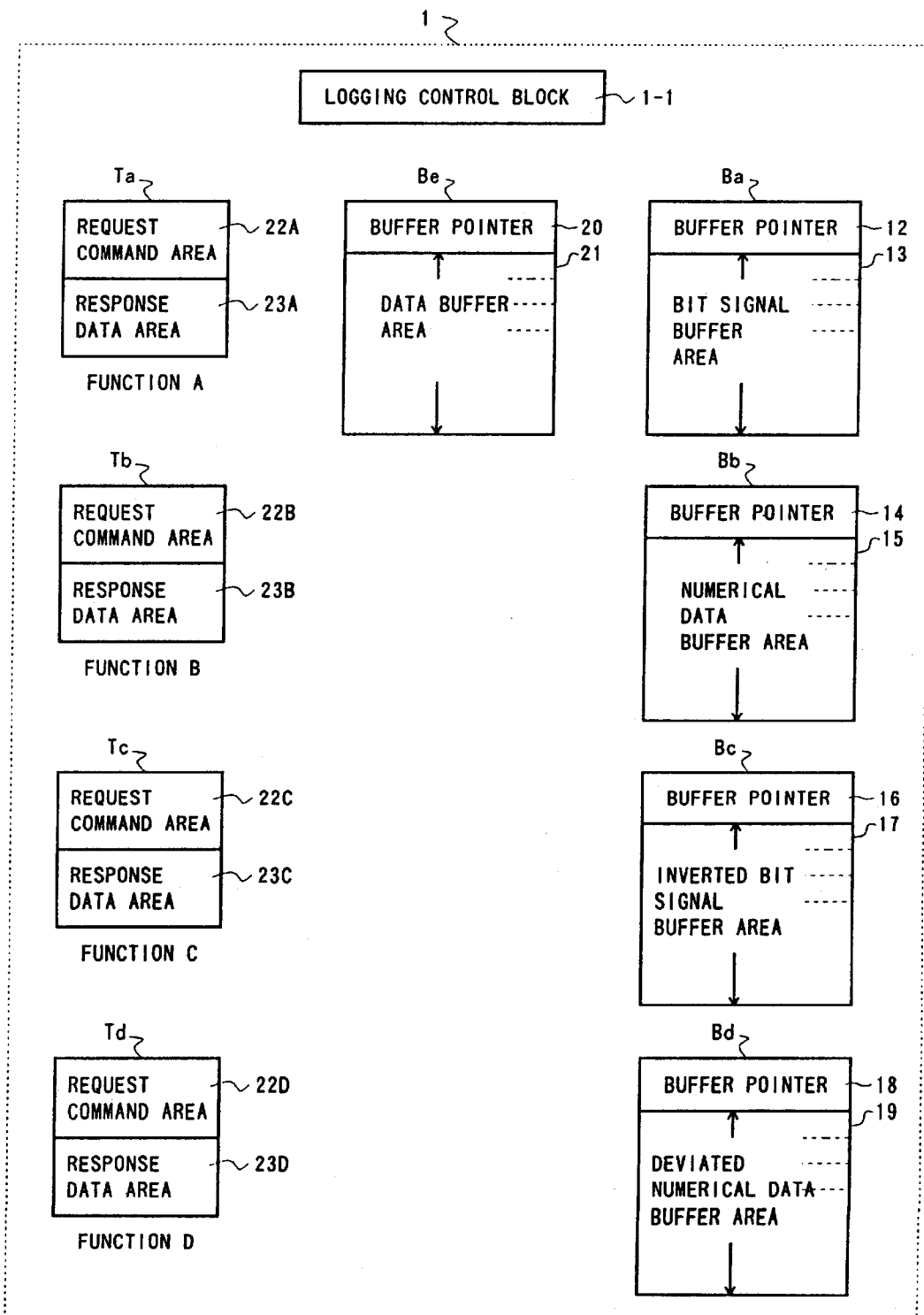
FIG. 6 is a view illustrating the internal configuration of the data collection task shown in FIG. 2.

FIG. 6 is a drawing illustrating the internal configuration of the data collection task 1 in the client machine devices 101a to 101c. The data collection task 1 has a storage control block 1—1, tables for individual function Ta to Td (Function A to Function D), and buffer tables Ba to Be. However, a table for individual functions corresponding to a function which the table does not take charge for is always empty.

The table for function A Ta comprises a request command area 22a which stores a request command (a request for data fetch) from a function A database data generation task 2A and a response data area 23A which stores a response to the request command. Other tables for individual functions Tb to Td have almost the same configuration as that of the table for function Ta, but include request command areas 22B to 22D and response data areas 23B to 23D each responding to each individual function respectively.

The buffer table Ba comprises a buffer pointer 12 which points data to be stored and a bit signal buffer area 13 in which a bit signal is stored. Also the buffer Bb comprises a buffer pointer 14 which points data to be stored and a numerical data buffer area 15 which stores the numerical data. Furthermore, a buffer Bc comprises a buffer pointer 16 and an inverted bit signal buffer area 17 which stores an bit signal inverted from that collected previously.

Also, a buffer table Bd comprises a buffer pointer 18 which points data to be stored and a deviated numerical data buffer area 19 which stores numerical data that deviated from a specified allowable range. Furthermore a buffer table Be comprises a buffer pointer 20 which points data to be stored and a data buffer area 21 which stores data fetched from the buffer tables Bc and Bd according to a request command from the individual function database data generation tasks 2A to 2D.

Figure 7:
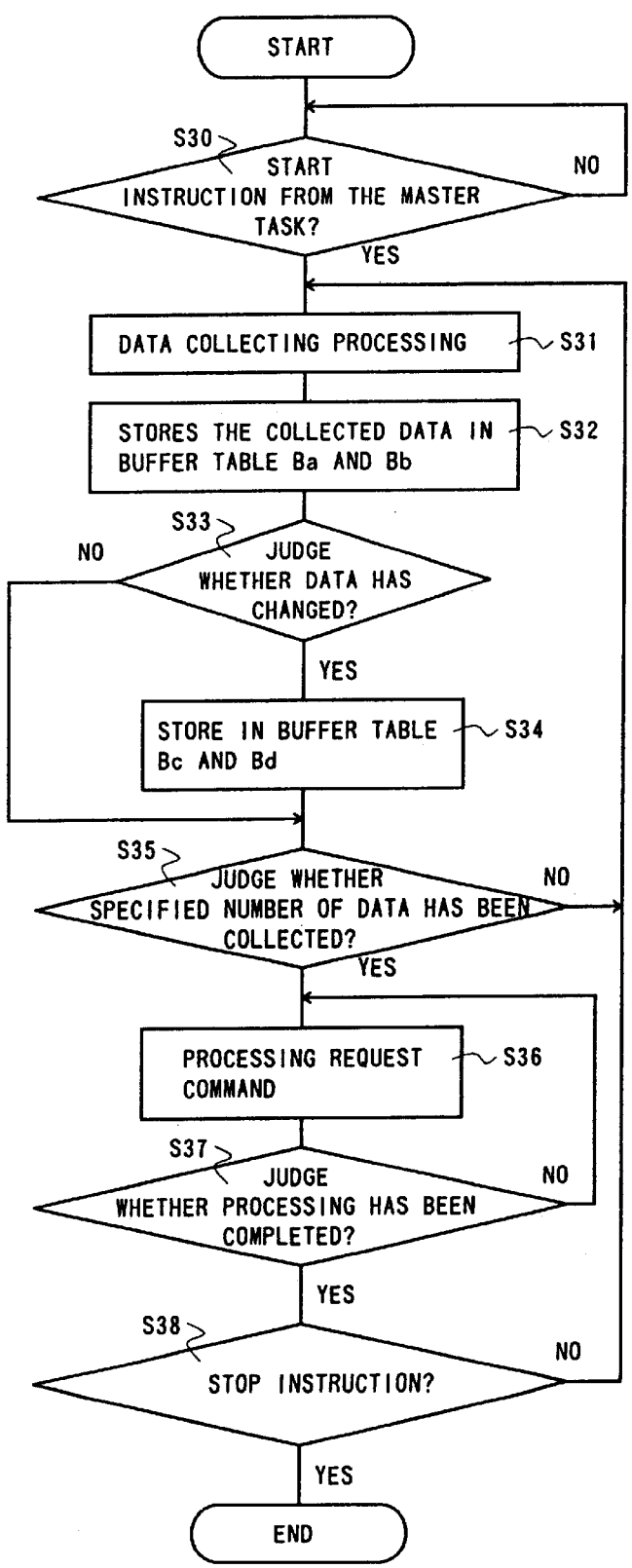
FIG. 7 is a flow chart illustrating operations of the data collection task shown in FIG. 2.

Next a description is made hereinafter for operations. FIG. 7 is a flow chart illustrating operations of the data collection task 1 in each of the client machine devices 101a to 101c. At first the data collection task 1 makes a determination as to whether a start instruction from the master task 11 has been accepted or not (S30), and if the task determines that the instruction was accepted, the task collects data from the PLCs 86a to 86c at a specified interval (S31). Then the data collection task 1 stores the collected data in the buffer table Ba if the data is a bit signal, and in the buffer table Bb if the data is numerical one (S32).

Then, the data collection task 1 makes a determination as to whether the collected data has changed from those collected previously or not (S33), or more concretely as to whether the bit signal has inverted or not, or whether the numerical data has deviated from a specified allowable range or not, and if it determines that the data has changed, the data collection task 1 stores the inverted bit signal in the buffer table Bc and the numeral data deviating from a predetermined allowable range, if any, in the buffer table Bd (S34). On the contrary, if the data collection task 1 determines that the collected data has not changed from those collected previously, then it makes a determination as to whether a predetermined number of data have been collected or not (S35). Then, if it determines that the specified number of data have already been collected, the data collection task 1 fetches responses which correspond to the request commands stored in the request command areas 23A to 23D (Refer to FIG. 6) from the buffer table Bc, Bd and stores the responses in the response data areas 23A to 23D (Refer to FIG. 6) (S36), and on the contrary if it determined that the specified number of data have not been collected yet, the data collection task 1 returns to the step S31 described above.

Then, the data collection task 1 makes a determination as to whether all the request commands have been processed or not (S37). If it determines that all the request commands have been processed, then the data collection task 1 makes a determination as to whether a stop instruction has been issued from the master task 11 (S38), and on the contrary if it determines that all the request commands have not been processed yet, the data collection task 1 is returned to the step S36 above. Also in the step S38 above, if it determines that a stop instruction has been issued, then the data collection task 1 stops the processing, and if it determines that the stop instruction has not been issued, the data collection task 1 returns to the step S31 described above.

Figure 8:
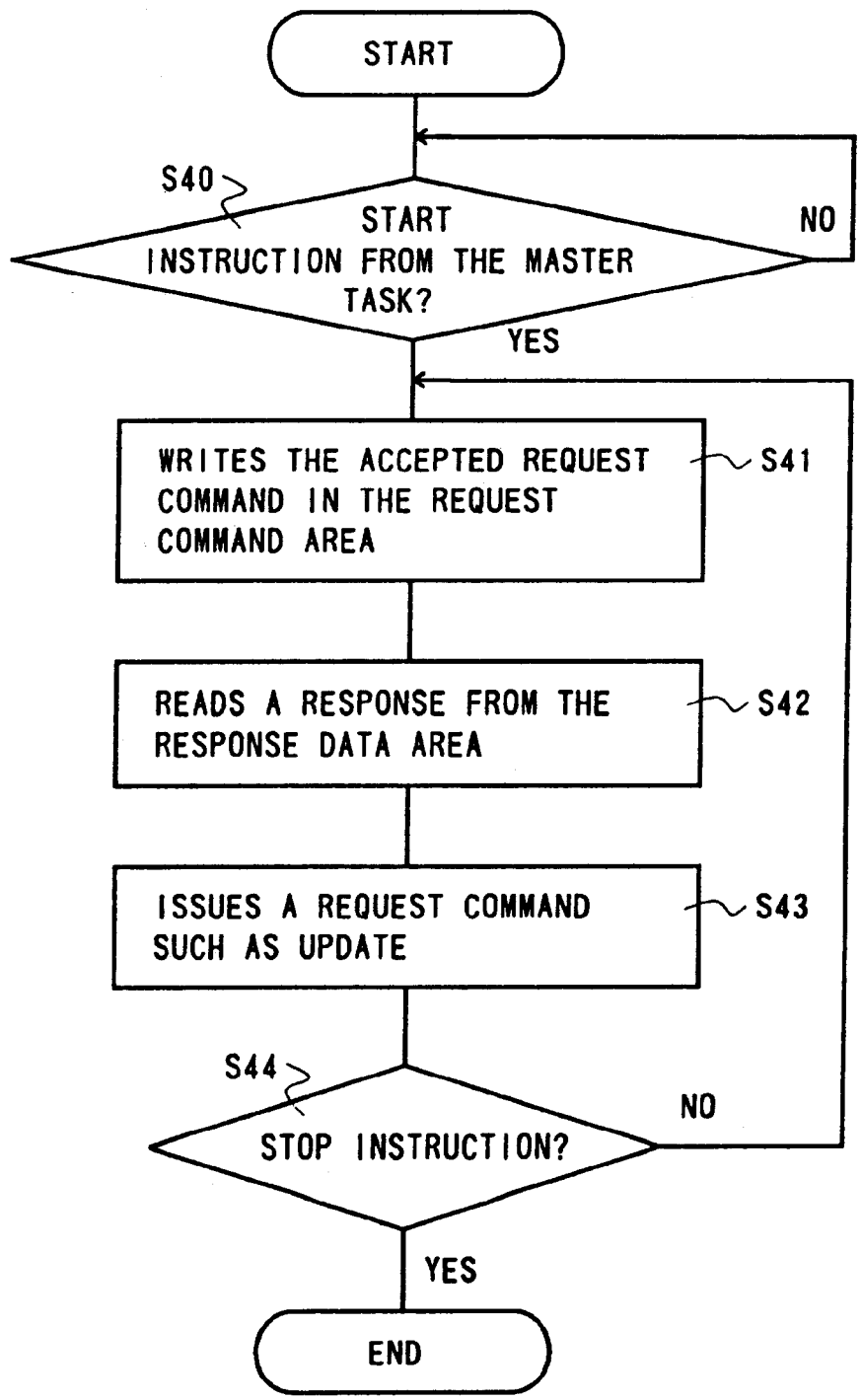
FIG. 8 is a flow chart illustrating operations of a function A data generation task for database.

FIG. 8 is a flow chart illustrating operations of the function A database data generation task 2A. It should be noted that, although all of the function B database data generation task 2B to the function D database data generation task 2D are almost the same, each task is carried out in response to each corresponding function. The function A database data generation task 2A makes a determination as to whether a start instruction from the master task 11 has been accepted or not (S40), and writes the accepted request command in the request command area 22A of the function A table Ta (Refer to FIG. 6) (S41).

The data generation task 2A reads a response from the response data area 23A of the function A table Ta (S42) and issues a request command (such as generation, renewal, or insertion) to the database 6a via the network database communication task 3 to the server 6 (S43). Then the data generation task 2A makes a determination as to whether a stop instruction has been issued from the master task 11 (S44). If it determines that the stop instruction has been issued, the data generation task 2A stops processing, and on the contrary if it determines that the stop instruction has not been issued, the data generation task 2A returns to the step 41 described above.

With the first embodiment of the present invention described above, an operator can freely connect or disconnect any of the database data generation tasks 2A to 2D for functions A to D respectively and any of the data processing task 7A to 7D for function A database to function D database respectively, so that the operator can easily adjust the work load of any of the client machine devices 101a to 101c. Also the data collection task 1 delivers a response to a request command directly to each of the database data generation tasks 2A to 2D for functions A to D database respectively, so that a time required for transmission can be reduced.

Figure 9:
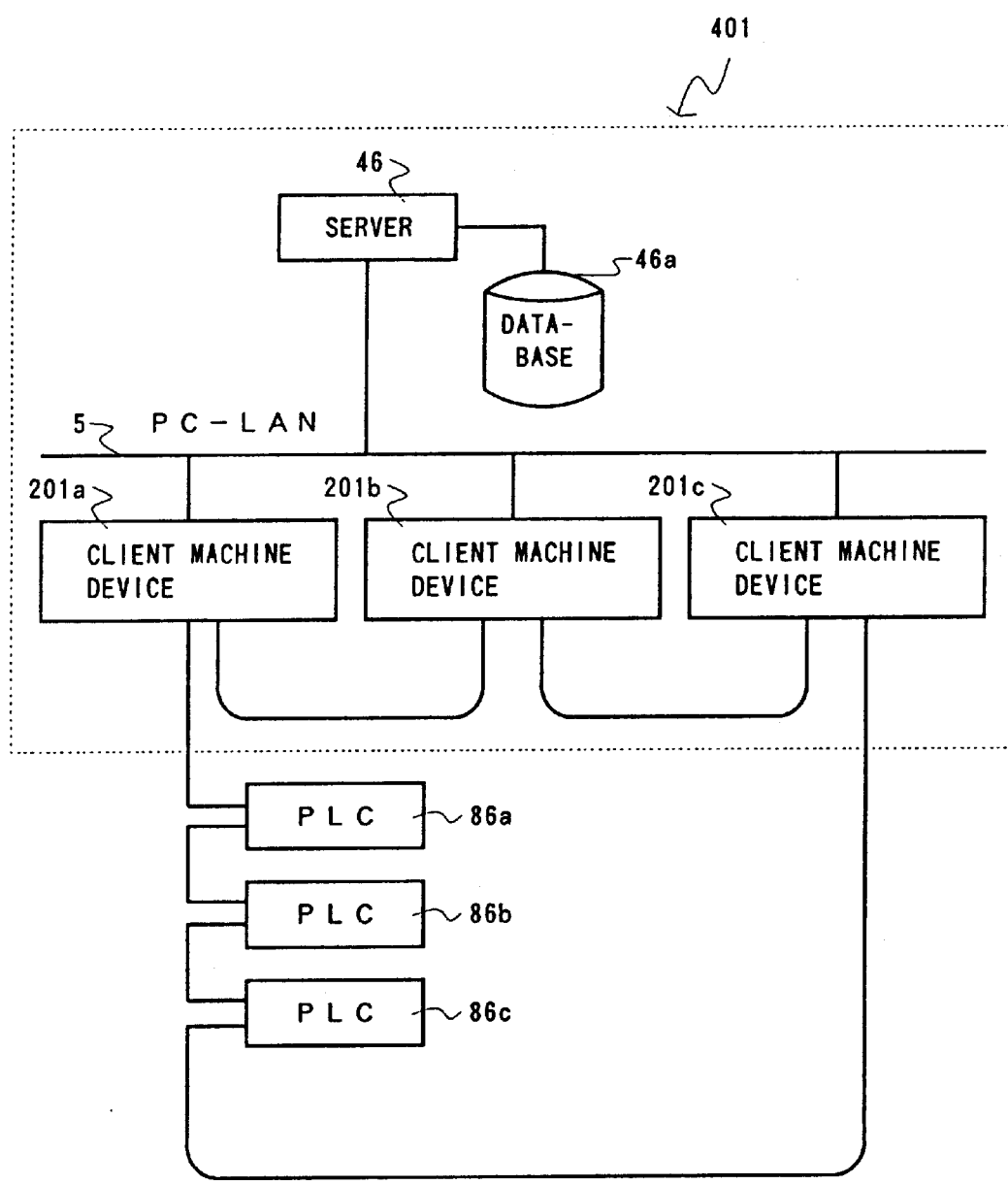
FIG. 9 is a block diagram illustrating the general configuration of the client server system according to the present invention.
Figure 10:
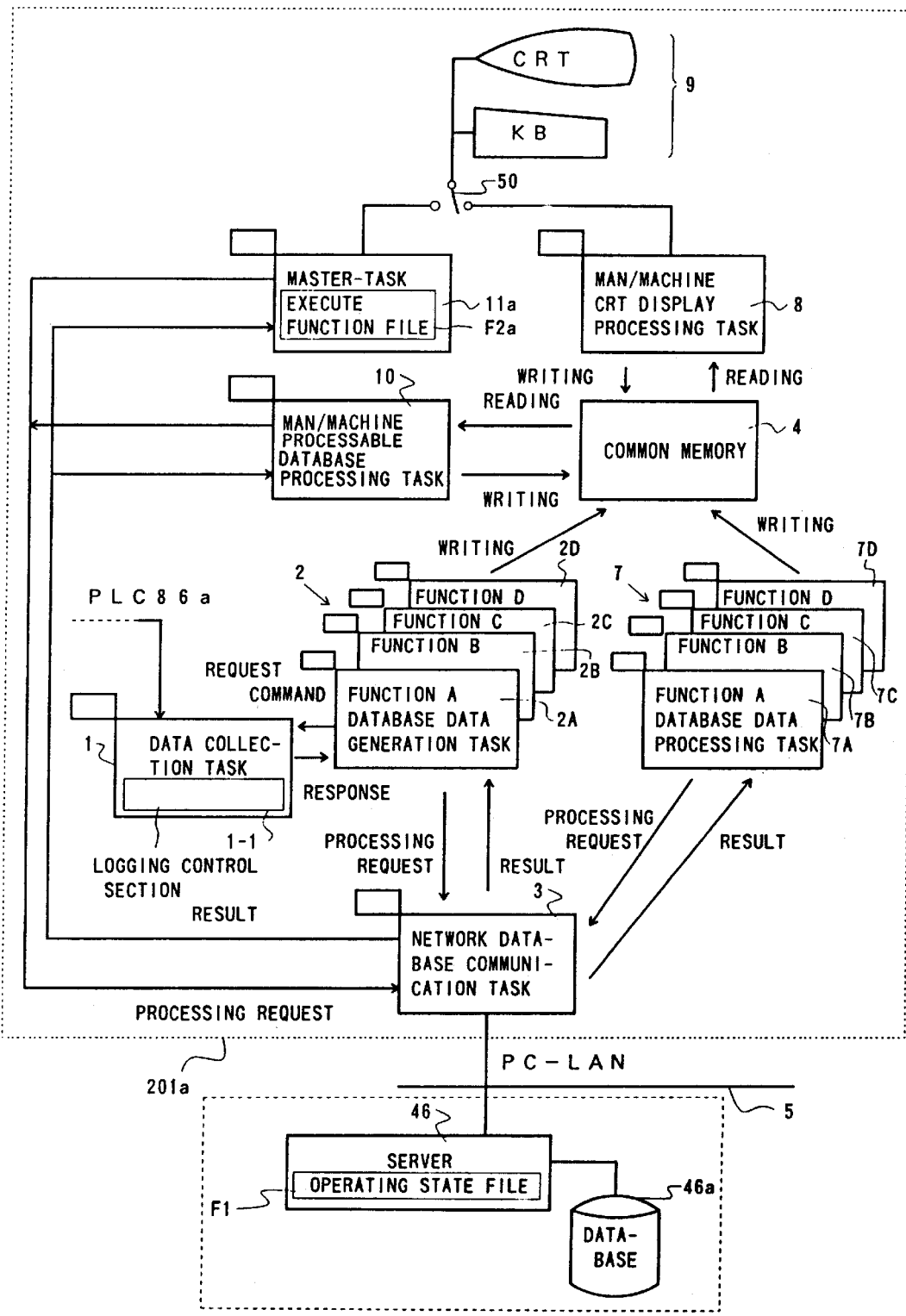
FIG. 10 is a block diagram illustrating the task configuration in the client machine device shown in FIG. 9.

Next, description is made hereinafter for a second embodiment of the present invention. FIG. 9 is a block diagram illustrating the general configuration of a client server system 401 including client machine devices 210a to 210c, and FIG. 10 is a block diagram illustrating the general configuration of the client machine device 201. The client machine devices 201a to 201c have almost the same configuration as that of the client machine devices 101a to 101c respectively, but each of the client machine devices has the database data generation tasks 2A to 2D for functions A to D respectively as well as database data processing tasks 7A to 7D for functions A to D respectively. The reference numeral 50 is a switch for switching a signal line comprised by the master-task 11 and the console device 9, or the man/machine CRT display processing task 8 and the console device 9.

Also each of master tasks 11a to 11c (Master tasks 11a and 11b not shown herein) of the client machine devices 201a to 201c respectively has execute function files F2a to F2c in which functions to be executed are stored (Refer to FIGS. 14A to C). Also each of the master tasks 11a to 11c reports periodically an operating state to a server 46 and updates the operating state file F1 (Refer to File 13) which is stored in the server 46.

Figure 11:
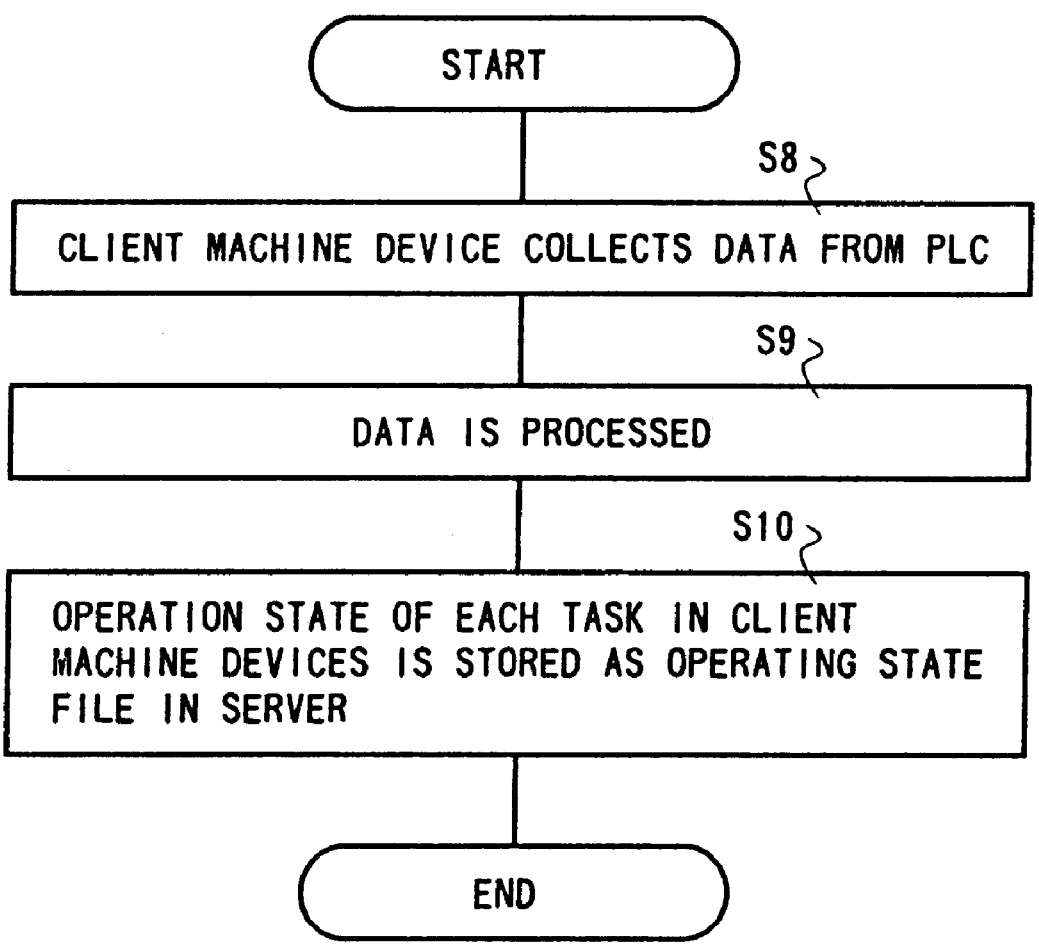
FIG. 11 is a flow chart illustrating fundamental operations of the client server system according to the present invention.

Next, description is made of the fundamental operations of the client sever system according to this embodiment. FIG. 11 is a flow chart illustrating operations wherein, at first, the client machine device 101a to 101c collects data from the PLCs 86a to 86c (S8), the data collected by the data collection task 1 is processed (S9), and provided as an output to the server 6. After that, the operation state of each task in the client machine device 101a to 101c is stored as an operating state file in the server 6 (S10).

Figure 12:
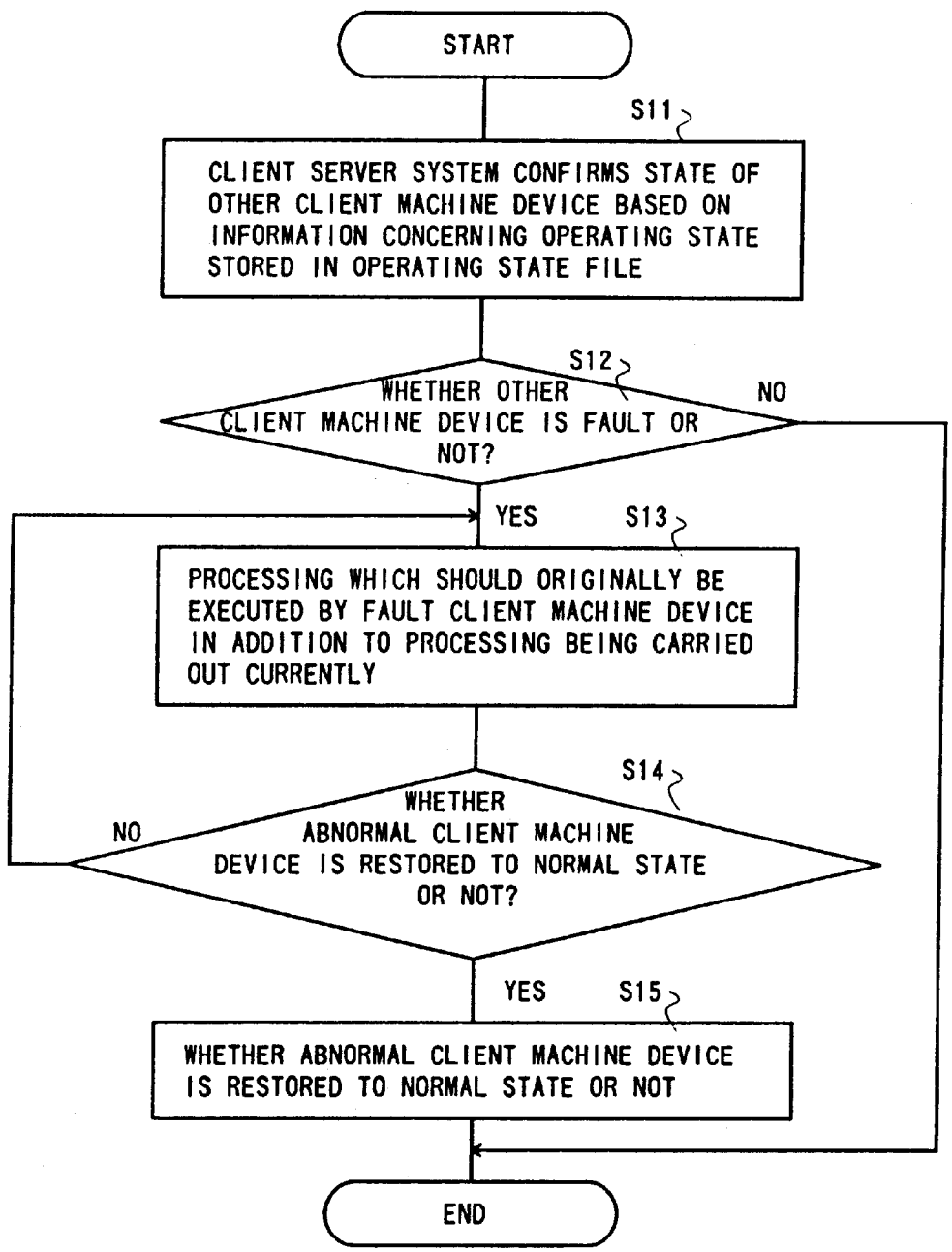
FIG. 12 is a flow chart illustrating fundamental operations of the client server system according to the present invention.

FIG. 12 is a flow chart illustrating operations wherein, the client server system 301 confirms the state of other client machine device based on information concerning the operating state stored in the operating state file (S11), and makes a determination whether any client machine devices are in a fault state or not (S12). As a result, if any client machine device is in a fault state, processing which should originally be executed by the fault state client machine device is carried out by another client in addition to the processing being carried out currently (S13). After that, client server system 301 makes a determination whether the abnormal client machine device is restored to the normal state or not (S14), and executes regular processing in the normal state before the fault state was detected when the abnormal client machine device is restored to the normal state (S15).

Next, a description is made for operations in this embodiment. The data collection task 1 is a task for collecting data from the PLCs 86a to 86c, and the program is common to all the client machine devices 201a to 210c shown in FIG. 9. Namely the data collection task 1 collects all data required by database data generation tasks for functions A to D, and each individual function database data generation task and each individual function database data processing task can provide controls over an event sequence by the master task 11a.

Operations of each task are the same as those of the client machine device 101a shown in FIG. 2, and all the same programs excluding the programs for the master task 11a are stored in each of the client machine devices 201a to 201c shown in FIG. 9. The amount of data processed by each of database data generation tasks 2A to 2D shown in FIG. 10 as well as by each of the database data processing tasks 7A to 7D are larger than the number of data processed by each task shown in FIG. 2, but the data flow between each task is identical.

FIG. 13 is a drawing illustrating contents of the operating state file F1. This operating state file F1 comprises a device No. column P1, an operating state column P2, a database data generation task column P3, and a database data processing task column P4. Device numbers "001" to "003" for the client machine devices 210a to 210c are stored in the device number column P1. So, a record 1 corresponding to, for instance, the device number "001" is shown in an area surrounded by a heavy line frame. "1" meaning normal or "0" meaning fault for each device is stores in the operating state column P2.

"1" meaning working or "0" meaning down for each of the database data generation tasks 2A to 2D for functions A to D is written in the data generation task column for database P3. "1" meaning working or "0" meaning down for each of the database data processing tasks 7A to 7D for functions A to D is written in the database data processing task column P4. Each of the database data processing tasks 7A to 7D for functions A to D is written in the database data processing task column P4.

FIG. 14A is a drawing illustrating the contents of an execute function file F2a for the client machine device 201a, and FIG. 14B is a drawing contents of an execute file F2b for the client machine device 201b, and furthermore FIG. 14C is a drawing illustrating the contents of an execute function file F2c for the client machine device 201c. It should be noted that these files F2a to F2c for functions to be executed by each client machine device can be defined and modified by an operator. The execute function file F2a for the client machine device 201a comprises a device number column Q1, a level column Q2, an operating state column Q3, a database data generation task column Q4, and a database data processing task column Q5. In the device number column, Q1 has stored "001" for device is own number, i.e. a first number. In the level column Q2 is stored "n" (n=1,2,3) for a level for the actual operating state column Q3. In the actual operating state column Q3 are stored "Other than those described below", "Device number 002 fault", and "Device number 002,003 fault". In the database data generation task column Q4 is stored "1" for a function to be executed by the database data generation task 2, or "0" for a function not to be executed by the database data generation task 2. In the database data processing task Q2 is stored "1" for a function to be executed by the database data processing task 7, or "0" for a function not to be executed by the database data processing task 7.

Figure 15:
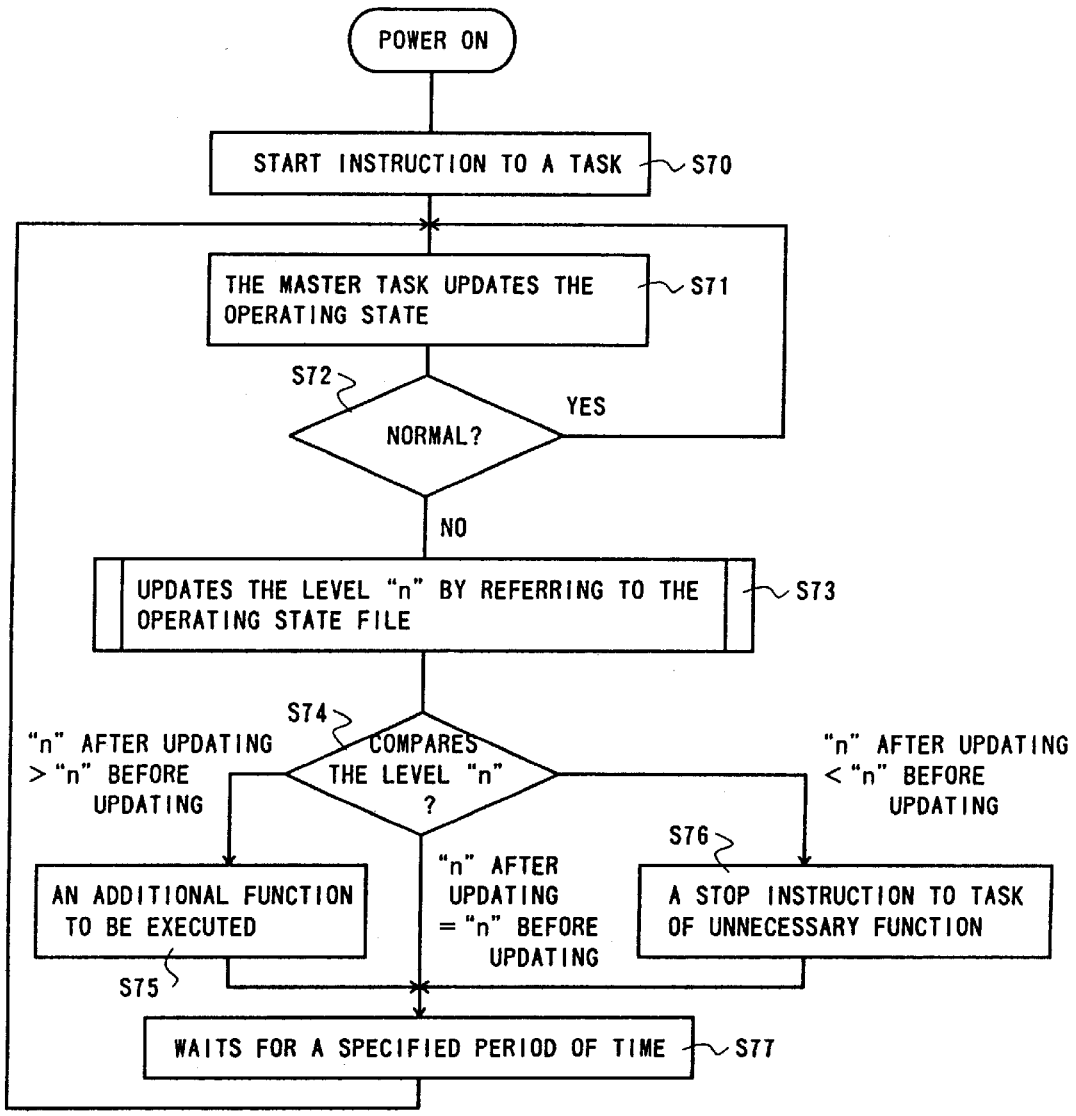
FIG. 15 is a flow chart illustrating operation of a master task shown in FIG. 10.
Figure 17:
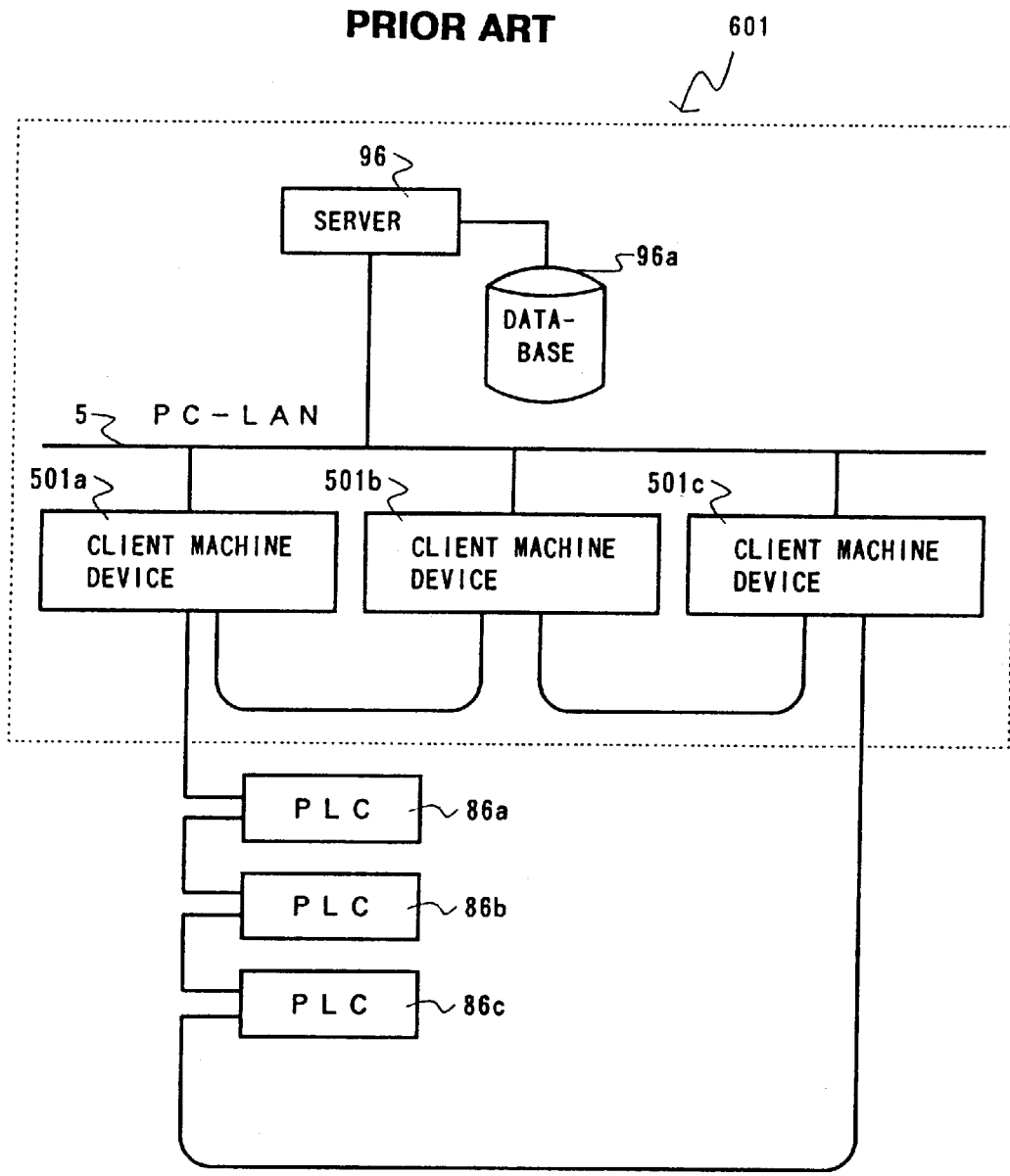
FIG. 17 is a block diagram illustrating the general configuration of a client server system based on the conventional art.
Figure 18:
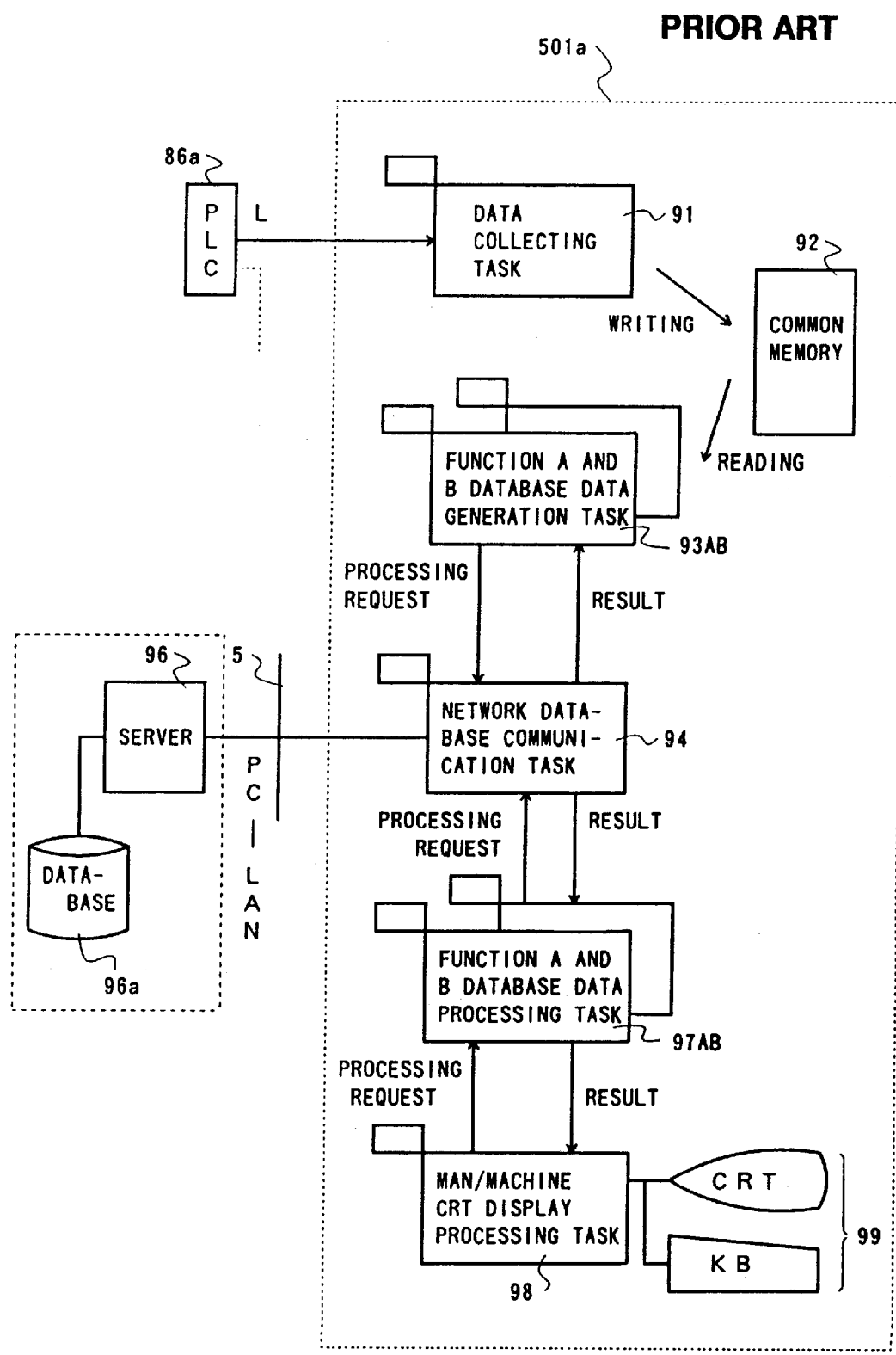
FIG. 18 is a block diagram illustrating a task configuration in the client machine device shown in FIG. 17.
Figure 19:
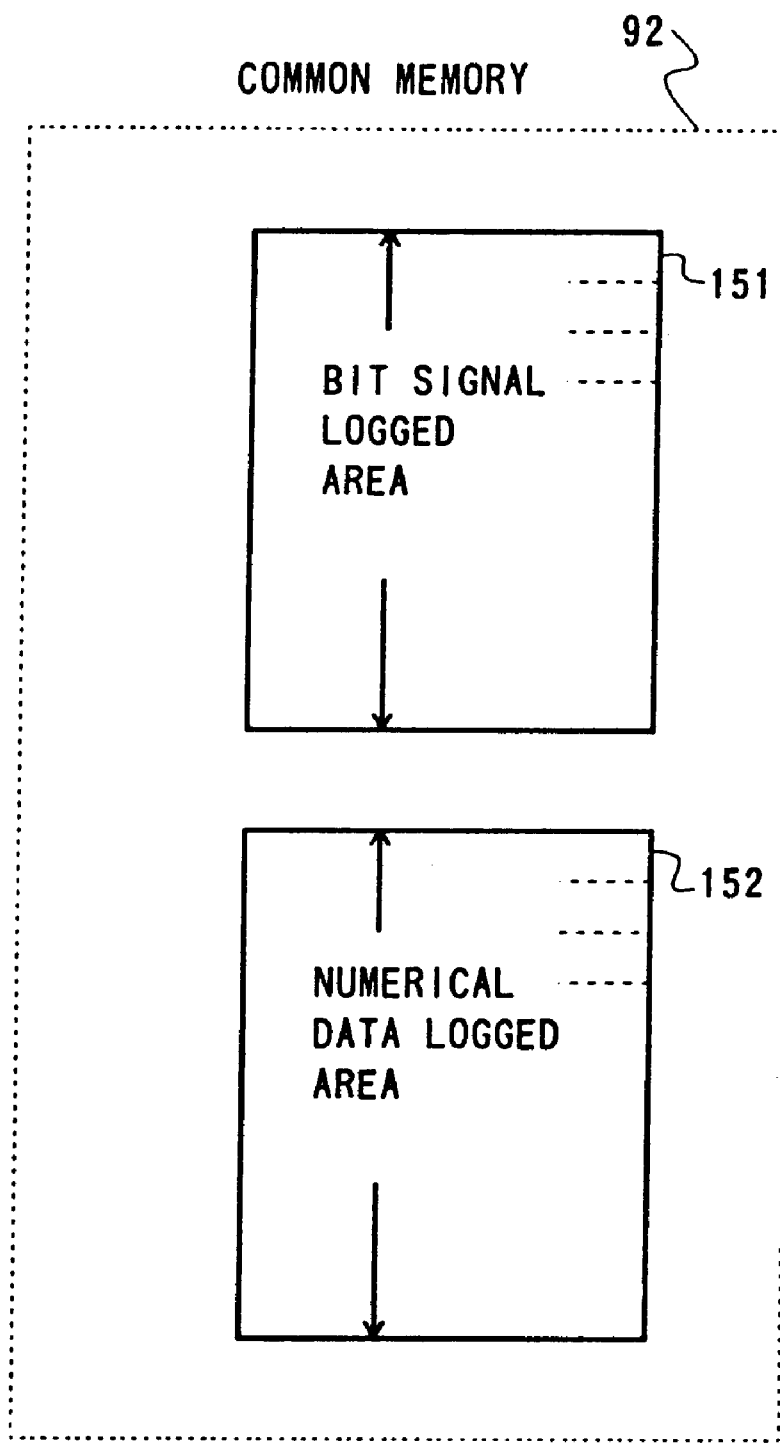
FIG. 19 is a block diagram illustrating a configuration of the common memory shown in FIG. 18.
Figure 20A:
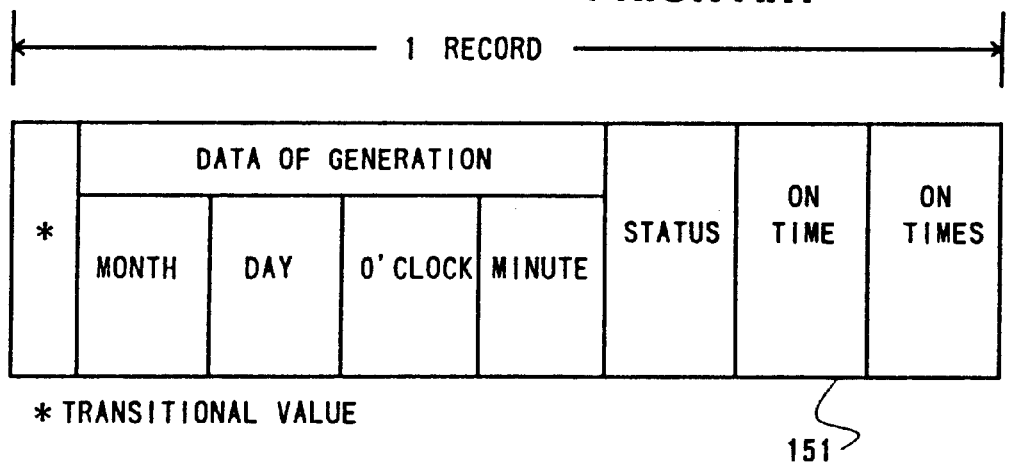
FIG. 20A is a view illustrating 1 record of stored data in the storage area shown in FIG. 19.
Figure 20B:
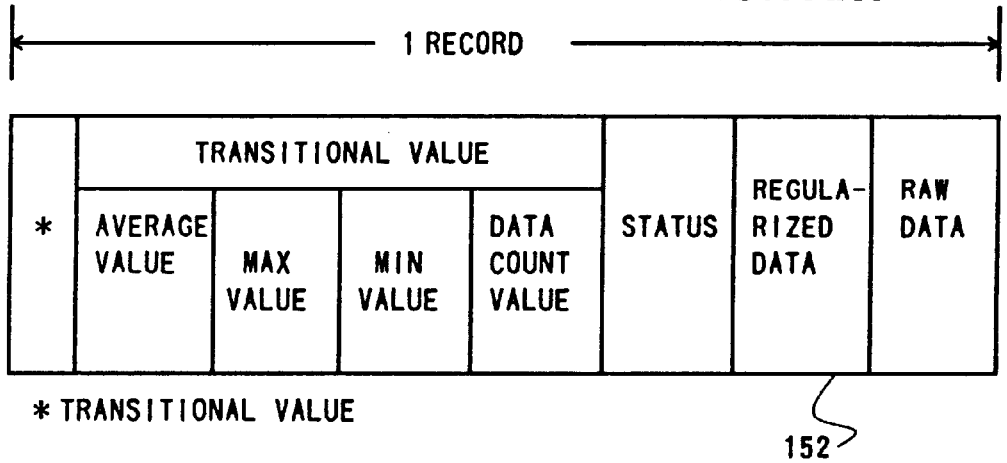
FIG. 20B is a view illustrating 1 record of stored data in the storage area shown in FIG. 19.

FIG. 15 is a flow chart illustrating operations of the master task 11a in the client machine device 201a. For convenience of description, it is assumed that the execute function file F2a shown in FIGS. 14A to C has already been registered in the master task 11a. At first, the master task 11a outputs start instruction to a task (for instance, the network database communication task 3) to be started first (S70). Then the master task 11a updates the operating state F1 for self device number "001" (S71). FIG. 15 assumes that the operating file F1 has been updated to that surrounded by a heavy line frame in FIG. 13.

Then the master task 11a makes a determination as to whether the updated operating state is normal or not based on the updated contents (S72), and if it determines that the operating state is normal, the master mask 11a returns to the step S71 described above, and on the contrary if it determines that the operation state is not normal, the master task 11a updates the level "n" by referring to the operating state file F1 for a number of a device to be monitored at the level "n" in the execute function file F2a (S73). It should be noted that n is equal to 1 in default. Herein, (1) if n=1, all contents of the operating state file F1 for device number "002" to be monitored is updated to "0". The updated contents is shown in an area surrounded by a heavy line in FIG. 11. And if the operating state column P2 is still "0" even after a predetermined time has passed, the master task 11a determines that the state is not normal, and updates n to 2; and (2) if n=2, the master task 11a makes a determination as to the state of device numbers "002" and "003" to be monitored. If the device number "002" has been restored, the master task 11a updates n to 1, and if, in addition to device number "002", device number "003" is also in fault state, the master task 11a updates n to 3; and (3) if n=3, the master task 11a makes a determination as to the state of device number "002" and device number "003" according to the same procedure as described above. If the device number "002" has been restored, the master task 11a updates n to 1, and if the device number "003" has been restored, the master task 11a updates n to 2.

Now returning to FIG. 15, the master task 11a compares the level "n" after updating to the level "n" before updating (S74). If the master task 11a determines that "n" after updating is larger than "n" before updating, the master task 11 issues a start instruction according to an additional function to be executed (S75). For instance, if n=1 is updated to n=2, the master task 11a issues a start instruction to the function C database data generation task 2C and the function C database data processing task 7C.

If "n" after updating is smaller than "n" before updating, the master task 11a issues a stop instruction according to a function which has become unnecessary. For instance, if n=3 is updated to n=2, the master task 11 issues a stop instruction to the function D database data task 2D and the function D database data processing task 7D (S76). If the master task 11a determines that "n" after updating is equal to "n" before updating, the master task 11a waits for a predetermined period of time (s77) and then return to the step S71 described above.

It should be noted that operations of the master task 11b and 11c in the client machine device 201b and 201c are almost the same as that of the master task 11a of the client machine device 201a. In the step S73, however, the master tasks 11b and 11c update level "n" using the execute function file F2b and F2c corresponding to the client machine device respectively. As the execute file F2b is used in the client machine device 201b, if n is equal to 1, the master task 11b updates 2 to 2 when the device number "003" to be monitored is in fault. So in the step S75, the master task 11b issues a start instruction to the function D database data generation task 2D and the function D database data processing task 7D.

With the second embodiment of the present invention described above, as a function which should originally be executed by a fault client machine device can be executed by an alternative client machine device, loss of data to be collected can be prevented. Also a spare client machine device becomes unnecessary, so a system can be built with a low cost.

Although the invention has been described with respect to specific embodiments for a complete and clear disclosure, the appended claims are not to be thus limited but are to be construed as embodying all modifications and alternative constructions that may occur to one skilled in the art which fairly fall within the basic teaching herein set forth.

What is claimed is:

1. A client server system for use with a plurality of control devices comprising:

server means for providing a server function;

a plurality of client machine devices, each having a common memory, a data collection task for collecting data from control devices, a data generation task for processing data collected by said data collecting task and providing said processed data as an output to said server as a common file, and a data base data processing task for providing at least one of data to said common memory and a processing request to said server means; wherein each said client machine device comprises:

means for providing a database data generation task, said data generation task comprising a plurality of first functional tasks, each first functional task corresponding to a different generation function;

means for providing a data base data processing task, said data processing task comprising a plurality of second functional tasks, each second functional task corresponding to a different processing function;

detecting means for detecting at least one of a work load concentration state and an abnormal state in other ones of said client machine devices;

control means for controlling each said database data generation task and said data base data processing task in each of said client machine devices and for executing at least one of said processing and generation functions originally scheduled to be executed by at least one other of said client machine devices which is in said work load concentration state or said abnormal state, when at least one of said work load concentration state or said abnormal state in said other client machine devices is detected by said detecting means.

2. A client server system as set forth in claim 1, wherein each said client machine devices further comprises means for providing a network database communication with said server means.

3. A client server system as set forth in claim 1, further comprising means for providing man/machine interactive processing using data stored in said common memory.

4. A client server system as set forth in claim 1, wherein said control means is operative to execute a plurality of functions originally executed by at least one of said other client machine devices in said work load concentration state or said abnormal state.

5. A client server system for use with a plurality of control devices comprising:

server means for providing a server function;

a plurality of client machine devices, each having a common memory, a data collection task for collecting data from control devices, a data generation task for processing data collected by said data collecting task and providing said processed data as an output to said server as a common file, and a data base data processing task for providing at least one of data to said common memory and a processing request to said server means;

wherein each said client machine device comprises:

means for providing a plurality of database data generation tasks, said data generation tasks comprising a plurality of first functional tasks, each first functional task corresponding to a different generation function;

means for providing a plurality of data base data processing tasks, said data processing tasks comprising a plurality of second functional tasks, each second functional task corresponding to a different processing function; and means for providing a master task for periodically reporting the operating state of said client machine device to said server means; and wherein said server means comprises means for confirming the state of each said client machine devices and shifting the processing from a faulty client machine device to at least another client machine device.

6. A method of controlling a client server system for use with a plurality of control devices comprising a server means, a communication network and a plurality of client machine devices connecting said server means and said client machine devices, comprising:

providing each client machine with a data collection task for collecting data from control devices;

providing each client machine with a data generation task for processing data collected by said data collecting task, said data generation task comprising a plurality of first functional tasks, and for providing said processed data as an output to said server means as a common file;

providing each client machine with a data base data processing task for providing at least one of data to said common memory and a processing request to said server means, said data processing task comprising a plurality of second functional tasks;

in a first client machine device, detecting at least one of a work load concentration state and an abnormal state in other ones of said client machine devices;

controlling each said database data generation task and said data base data processing task in each of said client machine devices and executing at least one of said first and second functional tasks originally scheduled to be executed by at least one of said other client machine devices when at least one of said work load concentration state or said abnormal state in said at least one of said other client machine devices is detected.

7. A method of controlling a client server system as set forth in claim 6, further comprising controlling said processing task functions in accordance with an event sequence prescribed by a master task.

8. A method of controlling a client server system as set forth in claim 6, wherein said data collecting task further comprises extracting changes in collected data.

9. A method of controlling a client server system as set forth in claim 6, further comprising requesting delivery of data to said data collection task and delivering data directly to said individual function database data tasks according to said delivery request.

10. A method of controlling a client server system for use with a plurality of control devices comprising a server means, a communication network and a plurality of client machine devices connecting said server means and said client machine devices, each client machine device having a common memory, said method comprising:

collecting data from control devices using data collection tasks provided in each client machine;

processing said collected data using at least one generation task for each client machine, said data generation task comprising a plurality of first functional tasks;

outputting said processed data to said server means as a common file;

detecting by said server means the state of said client machine devices based on operating state information provided by said client machine devices;

providing at least one of data to said common memory and a processing request to said server using a data processing task, said data processing task comprising a plurality of second functional tasks; and controlling each said database data generation task and said data base data processing task in said first client machine device and executing one of said tasks originally scheduled to be executed by at least one of said other client machine devices, when at least one of said work load concentration state or said abnormal state in said other client machine devices is detected.

11. A method of controlling a client server system as set forth in claim 10, further comprising executing a master task for con trolling said processing task functions in accordance with an event sequence.

12. A method of controlling a client server system as set forth in claim 10, further comprising at said first client machine device:

determining the state of said o other client machine devices based on information concerning the operating state stored in an operating stare file;

executing, if any other client machine is faulty, processing which should be executed by said faulty machine in addition to normal processing being carried out concurrently by said first client machine device; and executing normal processing in a normal state before said fault state was detected when said faulty client machine is restored to a normal condition.

13. A method of controlling a client server system as set forth in claim 12, further comprising controlling each database generation task in a client machine according to an event sequence.

14. A method of controlling a client server system as set forth in claim 10, further comprising storing the operation state of each task in a client machine device as an operating state file in said server means.

15. A method of controlling a client server system for use with a plurality of control devices comprising a server means, a communication network and a plurality of client machine devices connecting said server means and said client machine devices, comprising:

collecting data from control devices using data collection tasks provided in each client machine;

processing said collected data using at least one data generation task for each client machine, said data generation task comprising a plurality of first functional tasks;

outputting said processed data to said server means as a common file;

providing at least one of data to said common memory and a processing request to said server using a data processing task, said data processing task comprising a plurality of second functional tasks;

in a first client machine device, detecting at least one of a work load concentration state and an abnormal state in other of said client machine devices; and controlling each said database data generation task and said data base data processing task in said first client machine device and executing a function originally executed by at least one of said other client machine device, when at least one of said work load concentration state or said abnormal state in other client machine devices is detected.

16. A method of controlling a client server system as set forth in claim 15, further comprising executing a master task for controlling said processing task functions in accordance with an event sequence.

17. A method of controlling a client server system as set forth in claim 15, wherein said tasks are functionally disconnectable.

* * * * *